March 19, 1957  O. RUTHNER  2,785,957
REGENERATION OF PICKLING LIQUOR
Filed Feb. 28, 1955
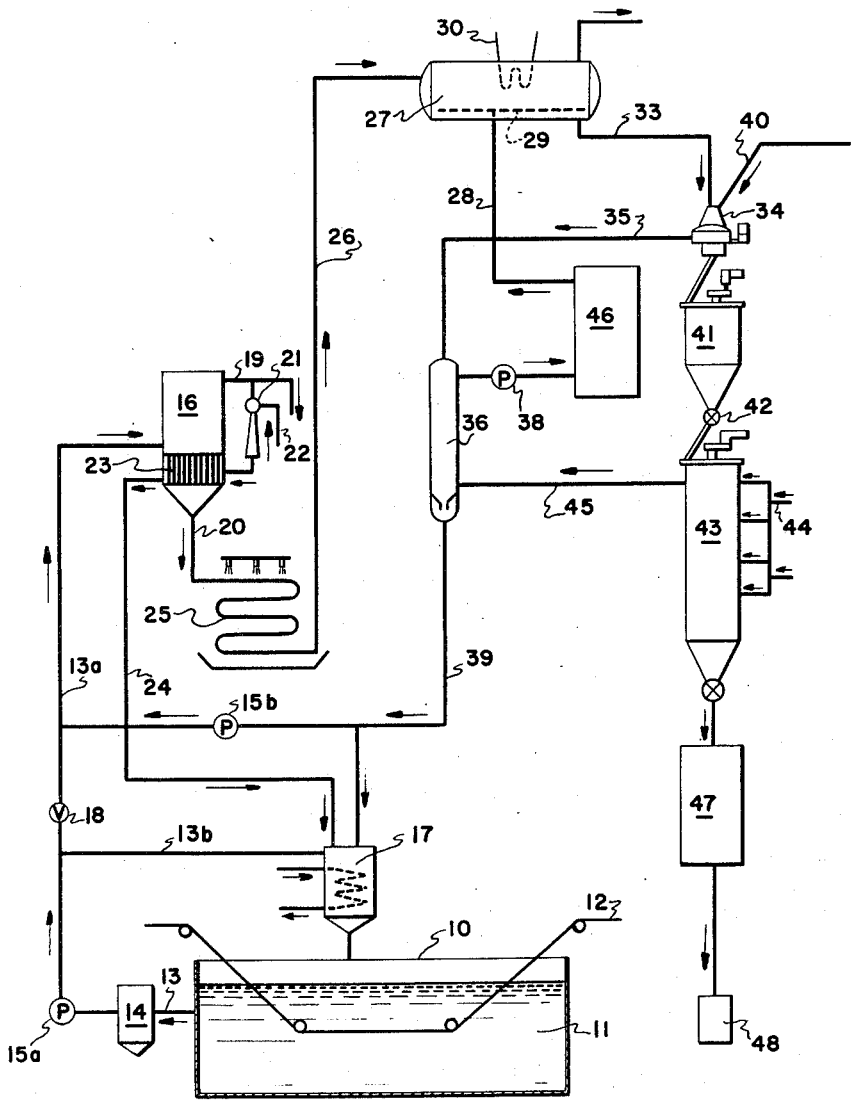
INVENTOR
OTHMAR RUTHNER
By his attorney
John F C Glenn

2,785,957

2,785,957
REGENERATION OF PICKLING LIQUOR

Othmar Ruthner, Vienna, Austria

Application February 28, 1955, Serial No. 491,156

12 Claims. (Cl. 23—172)

Metal treating plants, and particularly rolling and finishing mills for steel strip, "pickle" the metal in a sulfuric acid solution, according to chemical reactions of which $FeO + H_2SO_4 \rightarrow FeSO_4 + H_2O$ is typical. As the reaction continues the acid in the bath must be replenished, which requires the purchase of more acid, and in addition the ferrous sulfate must be disposed of, which is a difficult problem. In the past it has been customary to handle the spent pickle liquor as a purely waste product, and by means of a lime treatment to neutralize the waste preliminary to discharging it where it will do the least damage. Since pickling is carried on on a very large scale, the waste disposal problem is a large and serious one. Other processes than pickling, such as leaching, produce waste liquors containing sulfuric acid and ferrous sulfate which may also be treated according to this invention to recover sulfuric acid if desired.

In accordance with the present invention the problem is handled in an entirely different way, by reacting the ferrous sulfate ($FeSO_4$) with hydrogen chloride gas (HCl) to produce (1) sulfuric acid ($H_2SO_4$), which is recycled through the pickle bath, and (2) solid ferrous chloride dihydrate ($FeCl_2 \cdot 2H_2O$), which is roasted to produce hydrogen chloride gas and iron oxide. The latter hydrogen chloride gas is recycled to treat more ferrous sulfate, and the iron oxide may, for example, be used for making iron in blast furnaces or the like. The system is applicable to continuous as well as batch pickling, and to similar liquor from other processes, and that, plus the re-use of the acids involved and the useful nature of the iron oxide by-product, enable the system to change the ferrous sulfate of pickling baths and the like from an expensive nuisance to a useful intermediate material.

This application is a continuation-in-part of my co-pending application Serial No. 296,093 filed June 27, 1952, now abandoned.

For a better understanding of the invention, reference is now made to the present preferred embodiment of the pickle liquor treatment system illustrated diagrammatically in the accompanying drawing.

The illustrated system comprises a tank 10 containing a pickling bath 11 in which an iron body is submerged, such as a traveling steel strip 12. The bath 11 is an aqueous solution of sulfuric acid preferably maintained at a temperature in the range of 180–200° F. at a suitable concentration, usually within the range of 1–15%. The purpose of the bath 11 is to remove oxide on the steel strip 12, which is accomplished by the reaction of the sulfuric acid ($H_2SO_4$) with the iron oxide, producing ferrous sulfate ($FeSO_4$) and water ($H_2O$). As additional iron oxide reacts with the sulfuric acid the concentration of the acid tends to decrease and the concentration of the ferrous sulfate correspondingly tends to increase. For purposes of maintaining an effective pickling bath the ferrous sulfate concentration is maintained within the range of 2–22%. The ferrous sulfate is entirely dissolved in the solution and is not found therein in solid state.

A conduit 13 is connected to the tank 10 for purposes of withdrawing partially spent liquor from the bath 11 as the first step in maintaining the desired strength of the bath. A filter 14 in the conduit 13 removes solid particles in the liquor withdrawn from the bath, and a pump 15a keeps the fluid moving through conduit 13 at the desired rate and pressure. One branch 13a of conduit 13 extends to a salting-out type evaporator 16, where the treatment of the liquor begins, and another branch 13b passes through a heating and blending tank 17 and discharges back into the bath 11. A throttle valve 18 in the branch 13a adjustably controls the proportion of the flow through conduit 13 passing into branches 13a and 13b, respectively, in order to control the concentration of the pickle liquor entering the pickling bath as recovered sulfuric acid is returned to it.

The evaporator 16 is preferably operated at atmospheric or subatmospheric pressure, and discharges water vapor through top outlet 19 while discharging a slurry concentrate of spent liquor, consisting of acid solution and precipitated ferrous sulfate, as $FeSO_4 \cdot H_2O$, through a bottom outlet 20. The concentrated discharge slurry is preferably maintained at a total sulfate content, including both free acid and ferrous sulfate, such that about 40–60% sulfuric acid will be discharged from the reactor 27 hereinafter described. In order to have a slurry which can be pumped for further processing, the liquid content may be augmented by operating a pump 15b to add recovered concentrated sulfuric acid to conduit branch 13a, from a conduit 39 hereinafter described. The suction inlet of a steam injector 21 may be connected to the evaporator outlet 19, and the steam may be supplied through a steam inlet 22 of the injector 21 to compress and carry water vapor from evaporator 16 into steam chest 23 within the evaporator 16 for purposes of heating the spent liquor entering the evaporator. The steam chest 23 discharges condensed water through a conduit 24 which discharges to the heating and blending tank 17 and thence into the pickling bath 11. The aqueous part of the acid vaporized in evaporator 16 is thereby returned to the pickling bath.

The concentrated slurry from evaporator 16 passes through its lower outlet 20 into cooling coils 25, which lower its temperature to about 100° F. or less. The cooled slurry then passes through conduit 26 into reactor tank 27.

The slurry fed through conduit 26 into reactor tank 27 forms a pool therein, and gaseous hydrogen chloride (HCl) is fed through a conduit 28 into a perforated sparge pipe 29 extending horizontally within reactor 27 below the level of the pool therein. HCl gas is thus bubbled through the pool to saturate it with HCl and to produce the reaction $$FeSO_4 \cdot H_2O + H_2O + 2HCl \rightarrow H_2SO_4 + FeCl_2 \cdot 2H_2O$$

The reaction is preferably conducted at atmospheric pressure, and in that case it is necessary to maintain a temperature in the reactor no higher than 25° C. in order to obtain complete reaction as above described. Temperatures may be higher in the reactor if increased pressure is employed. The reactor 27 is cooled by suitable means, such as the illustrated coils 30 submerged in the pool in the reactor, in order to prevent the heat of solution of HCl gas from increasing the temperature of the bath above the desired limit. Paddles (not shown) are also mounted in the reactor 27 and are operated by an agitator drive to keep the slurry in suspension as is well known in the art, and to distribute the HCl gas in the liquid bath. An atmosphere of HCl gas is maintained within the reactor 27 to maintain progress of the reaction (which is a reversible one) in the desired direction. Instead of a single reactor 27, as illustrated, a series of such reactors may be used, with the used HCl gas from the later reactors collected and reused in the initial reactor, for greater efficiency, as will be understood by those skilled in the art.

The slurry reaction product is withdrawn from the reactor 27 through an outlet conduit 33 connected to the inlet of a centrifuge 34, where the solid FeCl₂·2H₂O is separated and, if desired, washed with HCl solution supplied by conduit 40, and the liquid sulfuric acid filtrate and any accompanying HCl acid is carried off by a conduit 35 to the top of a degassing unit 36.

Degasser 36 consists of a tower containing porcelain or stoneware packing material. The acid may be heated to about 265° F. in the degasser 36, and the HCl gas is withdrawn from the top of the degasser through a blower 38, while the liquid sulfuric acid is discharged from the bottom of the degasser 36 through a conduit 39 to the tank 17, from which it is discharged back into the pickling bath 11 (or is partially bypassed through pump 15b into branch conduit 13a, as previously described). The heating medium preferred in the degasser is the hot gas from a roaster 43, described subsequently in these specifications, which gas is passed upwardly through the packing countercurrent to the liquid sulfuric acid. The sulfuric acid leaving the degasser is substantially free of HCl, but it may be further subjected to stripping with air or other inert gas (not shown in the drawing) to remove any residual trace of HCl if this is desired.

Substantially all of the sulfuric acid is removed by the centrifuge 41 through the conduit 35, and the ferrous chloride dihydrate remaining in the centrifuge is preferably washed with concentrated HCl solution supplied by a conduit 40, and the washed ferrous chloride is formed into a cake and discharged to a hopper 41. The HCl-washed and substantially sulfuric-acid free ferrous chloride dihydrate is then discharged from hopper 41 through feeder 42 into the upper end of a roaster 43, of any suitable type, a Herreschoff tray-type being indicated in the drawing.

The roaster 43 is preferably direct fired, as by air and fuel supplied through inlets 44, to heat the ferrous chloride dihydrate to a temperature of 500° to 1000° F. for a sufficient time and under suitable conditions to convert the iron to iron oxide and to evolve the chlorine as HCl gas. Such roasting is per se a well known chemical operation which may be effected with or without the presence of additional reactants, such as air or steam. In the case of a direct furnace as above described, however, air and steam would both ordinarily be present. Ferrous chloride dihydate may be roasted directly without preliminary dehydration, such as is necessary if higher hydrates were formed; and the formation of ferrous chloride in reactor 27 in the presence of about 40 to 60% sulfuric acid as previously described prevents the formation of such higher hydrates which are not suitable for roasting. Higher hydrates tend to melt in their water of crystallization on roasting and are therefore difficult to handle in such treatment.

The hot furnace gases including HCl are discharged from roaster 43 through conduit 45 to the base of degasser 36, where they supply heat to the sulfuric acid and are augmented by HCl evolved therein, the HCl being cooled thereby. Blower 38 removes the cooled HCl gas together with other gases, from the top of the degasser 36 and discharges the HCl into a purifier and cooler 46 where the HCl is separated from any other gases, further cooled, and then returned back to reactor 27 through conduit 28 as previously described.

The solid iron oxide in roaster 43 is discharged into a cooler 47, where it is cooled with water, and then it is collected in container 48 for subsequent use.

While I have illustrated and described a present preferred embodiment of the invention and method of practising the same, it will be understood that it is not limited thereto, but may be variously embodied and practiced within the scope of the following claims.

I claim:

1. A process for continuously recovering spent pickling liquor which contains sulfuric acid and dissolved ferrous sulfate with simultaneous recovery of iron oxide, which process comprises (1) precipitating solid hydrated ferrous sulfate contained in spent pickling liquor, (2) introducing hydrogen chloride gas to the spent pickle liquor and reacting said gas with the precipitated ferrous sulfate to form solid hydrated ferrous chloride and sulfuric acid, (3) separating the sulfuric acid and collecting said acid for use in a pickling bath, (4) heating the solid hydrated ferrous chloride to decompose it into hydrogen chloride gas and iron oxide, (5) removing the iron oxide from the hydrogen chloride gas, and (6) recycling the hydrogen chloride gas in a closed circuit for introduction to additional spent pickling liquor.

2. A continuous process for extracting iron in the form of iron oxides from spent sulfuric acid pickling baths and regenerating the sulfuric acid bath, comprising (1) continuously precipitating solid hydrated ferrous sulfate from said spent pickling bath, (2) passing hydrogen chloride gas in the intimate contact with the solid hydrated ferrous sulfate to convert the said ferrous sulfate into a mixture of solid hydrated ferrous chloride in sulfuric acid, (3) separating the sulfuric acid from the solid hydrated ferrous chloride for reuse in a sulfuric acid pickling bath, (4) heating the separated solid hydrated ferrous chloride in the presence of steam and air to evolve hydrogen chloride gas and to yield iron oxide, (5) recycling the evolved hydrogen chloride gas for continuous conversion of additional ferrous sulfate to solid crystalline hydrated ferrous chloride, and (6) removing the extracted iron oxide by-product from the process.

3. A process for recovering sulfuric acid and iron oxide from ferrous sulfate dissolved in sulfuric acid spent pickling and like liquor, comprising the steps of (1) forming a slurry in sulfuric acid of the ferrous sulfate in monohydrate form; (2) introducing hydrogen chloride gas to the slurry and reacting said gas with the ferrous sulfate monohydrate to form ferrous chloride dihydrate and sulfuric acid, while adjusting the amounts of sulfuric acid and ferrous sulfate in the slurry of step (1) to maintain 40–60% free sulfuric acid in the composition of the slurry during the reaction of step (2), (3) separating and removing the sulfuric acid produced in the step (2) reaction, (4) heating the ferrous chloride dihydrate to decompose it into hydrogen chloride gas and iron oxide, (5) removing the iron oxide from the hydrogen chloride gas, and (6) recycling the hydrogen chloride gas in a closed circuit for introduction to additional slurry.

4. A process for recovering sulfuric acid and iron oxide from ferrous sulfate dissolved in sulfuric acid spent pickling and like liquor, comprising the steps of (1) forming a slurry in sulfuric acid of the ferrous sulfate in solid hydrated form, (2) introducing hydrogen chloride gas to the slurry and reacting said gas with the precipitated ferrous sulfate to form solid ferrous chloride dihydrate and sulfuric acid, (3) separating and removing the sulfuric acid produced in the step (2) reaction, (4) heating the solid ferrous chloride dihydrate to decompose it into hydrogen chloride gas and iron oxide, (5) removing the iron oxide from the hydrogen chloride gas, and (6) recycling the hydrogen chloride gas in a closed circuit for introduction to additional slurry.

5. A process for recovering sulfuric acid and iron oxide from ferrous sulfate dissolved in sulfuric acid spent pickling and like liquor, comprising the steps of (1) forming a slurry in sulfuric acid of the ferrous sulfate in monohydrate form, (2) introducing hydrogen chloride gas to the slurry and reacting said gas with the precipitated ferrous sulfate to form solid hydrated ferrous chloride and sulfuric acid, (3) separating and removing the sulfuric acid produced in the step (2) reaction, (4) heating the solid hydrated ferrous chloride to decompose it into hydrogen chloride gas and iron oxide, (5) removing the iron oxide from the hydrogen chloride gas, and (6) recycling the hydrogen chloride gas in a closed circuit for introduction to additional spent pickling liquor.

6. A process for recovering sulfuric acid and iron oxide from ferrous sulfate dissolved in sulfuric acid spent pickling and like liquor, comprising the steps of (1) precipitating solid hydrated ferrous sulfate contained in spent pickling liquor to form a slurry while applying evaporative treatment to the solution to increase the sulfuric acid concentration sufficiently to effect precipitation of ferrous sulfate monohydrate, and separating, removing and condensing the aqueous portion of the solution evaporated in said evaporative treatment, (2) introducing hydrogen chloride gas to the spent pickle liquor and reacting said gas with the precipitated ferrous sulfate to form solid hydrated ferrous chloride and sulfuric acid, (3) separating and removing the sulfuric acid produced in the step (2) reaction, (4) heating the solid hydrated ferrous chloride to decompose it into hydrogen chloride gas and iron oxide, (5) removing the iron oxide from the hydrogen chloride gas, and (6) recycling the hydrogen chloride gas in a closed circuit for introduction to additional slurry.

7. A process for recovering sulfuric acid and iron oxide from ferrous sulfate dissolved in sulfuric acid spent pickling and like liquor, comprising the steps of (1) forming a slurry in sulfuric acid of the ferrous sulfate in solid hydrated form, (2) introducing hydrogen chloride gas to the slurry and at atmospheric pressure and not over 25° C. temperature reacting said gas with the precipitated ferrous sulfate to form solid hydrated ferrous chloide and sulfuric acid, (3) separating and removing the sulfuric acid produced in the step (2) reaction, (4) heating the solid hydrated ferrous chloride to decompose it into hydrogen chloride gas and iron oxide, (5) removing the iron oxide from the hydrogen chloride gas, and (6) recycling the hydrogen chloride gas in a closed circuit for introduction to additional slurry.

8. A process for recovering sulfuric acid and iron oxide from ferrous sulfate dissolved in sulfuric acid spent pickling and like liquor, comprising the steps of (1) partially evaporating such spent pickle liquor and thereby precipitating solid hydrated ferrous sulfate contained in the spent pickling liquor to form a slurry, (2) pumping the slurry and thereafter introducing hydrogen chloride gas to the slurry and reacting said gas with the precipitated ferrous sulfate to form solid hydrated ferrous chloride and sulfuric acid, (3) separating and removing the sulfuric acid produced in the step (2) reaction and feeding a regulated portion of the separated acid into the slurry of step (1) to maintain a sufficiently fluid condition for pumping the slurry in step (2), (4) heating the solid hydrated ferrous chloride to decompose it into hydrogen chloride gas and iron oxide, (5) removing the iron oxide from the hydrogen chloride gas, and (6) recycling the hydrogen chloride gas in a closed circuit for introduction to additional slurry.

9. A process for recovering sulfuric acid and iron oxide from ferrous sulfate dissolved in sulfuric acid spent pickling and like liquor, comprising the steps of (1) forming a slurry in sulfuric acid of the ferrous sulfate in solid hydrated form, (2) introducing hydrogen chloride gas to the slurry and reacting said gas with the precipitated ferrous sulfate to form solid hydrated ferrous chloride and sulfuric acid, (3) mechanically separating the sulfuric acid from the solid hydrated ferrous chloride before the latter is treated according to step (4), heating the separated sulfuric acid to remove dissolved hydrogen chloride, and after such separation and removal, collecting the sulfuric acid for subsequent use, (4) heating the solid hydrated ferrous chloride to decompose it into hydrogen chloride gas and iron oxide, (5) removing the iron oxide from the hydrogen chloride gas, and (6) recycling the hydrogen chloride gas in a closed circuit for introduction to additional slurry.

10. A process for recovering sulfuric acid and iron oxide from ferrous sulfate dissolved in sulfuric acid spent pickling and like liquor, comprising the steps of (1) forming a slurry in sulfuric acid of the ferrous sulfate in solid hydrated form, (2) introducing hydrogen chloride gas to the slurry and reacting said gas with the precipitated ferrous sulfate to form solid hydrated ferrous chloride and sulfuric acid, (3) mechanically separating the sulfuric acid from the solid hydrated ferrous chloride before the latter is treated according to step (4), heating the separated sulfuric acid to remove dissolved hydrogen chloride, and after such separation and removal, collecting the sulfuric acid for subsequent use, (4) heating the solid hydrated ferrous chloride at a temperature in the range of 500 to 1000° F. to decompose it into hydrogen chloride gas and iron oxide, (5) removing the iron oxide from the hydrogen chloride gas, and (6) recycling the hydrogen chloride gas in a closed circuit for introduction to additional slurry.

11. A process for recovering sulfuric acid and iron oxide from ferrous sulfate dissolved in sulfuric acid spent pickling and like liquor, comprising the steps of (1) forming a slurry in sulfuric acid of the ferrous sulfate in solid hydrated form, (2) introducing hydrogen chloride gas to the slurry and reacting said gas with the precipitated ferrous sulfate to form solid hydrated ferrous chloride and sulfuric acid while maintaining such concentration of sulfuric acid present during the reaction as to yield the ferrous chloride in the form of ferrous chloride dihydrate, (3) mechanically separating the sulfuric acid from the ferrous chloride dihydrate before the latter is treated according to step (4), heating the separated sulfuric acid to remove dissolved hydrogen chloride, and after such separation and removal, collecting the sulfuric acid for subsequent use, (4) heating the ferrous chloride dihydrate at temperatures in the range of 500 to 1000° F. to decompose it into hydrogen chloride gas and iron oxide, (5) removing the iron oxide from the hydrogen chloride gas, and (6) recycling the hydrogen chloride gas in a closed circuit for introduction to additional slurry.

12. A process for recovering sulfuric acid and iron oxide from ferrous sulfate dissolved in sulfuric acid spent pickling and like liquor, comprising the steps of (1) forming a slurry in sulfuric acid of the ferrous sulfate in solid hydrated form, (2) introducing hydrogen chloride gas to the slurry and reacting said gas with the precipitated ferrous sulfate to form solid hydrated ferrous chloride and sulfuric acid, (3) mechanically separating the sulfuric acid from the solid hydrated ferrous chloride before the latter is treated according to step (4), heating the separated sulfuric acid with hot hydrogen chloride gas obtained from step (5) to remove dissolved hydrogen chloride, and after such separation and removal, collecting the sulfuric acid for subsequent use, (4) heating the solid hydrated ferrous chloride at a temperature in the range of 500 to 1000° F. to decompose it into hydrogen chloride gas and iron oxide, (5) removing the iron oxide from the hydrogen chloride gas, and (6) recycling the hydrogen chloride gas in a closed circuit, first using it to heat the separated sulfuric acid of step (4), and subsequently introducing it for reaction in step (2).

References Cited in the file of this patent

UNITED STATES PATENTS

| | | |
|---|---|---|
| 2,394,579 | Ayers | Feb. 12, 1946 |
| 2,428,221 | Hudson | Sept. 30, 1947 |
| 2,592,580 | Loevenstein | Apr. 15, 1952 |

FOREIGN PATENTS

| | | |
|---|---|---|
| 703,142 | Great Britain | Jan. 27, 1954 |

OTHER REFERENCES

Mellor: Comp. Treat. on Inorg. & Theo. Chem., vol. 14, pg. 270, Longmans, Green and Company, 1935.